United States Patent [19]

Checchetti

[11] Patent Number: 4,963,726

[45] Date of Patent: Oct. 16, 1990

[54] DEVICE FOR THE OPTICAL READING OF PLANAR INFORMATION CARRIERS

[75] Inventor: Maurizio Checchetti, Milan, Italy

[73] Assignee: Microptronics S.r.l., Milan, Italy

[21] Appl. No.: 346,851

[22] Filed: May 3, 1989

[30] Foreign Application Priority Data

May 19, 1988 [IT] Italy ............................... 20641 A/88

[51] Int. Cl.$^5$ ............................................. H01J 40/14
[52] U.S. Cl. ................................ 250/208.1; 235/440; 235/454; 358/496; 350/6.1
[58] Field of Search ............... 350/6.1, 486, 321, 500, 350/501, 502, 6.7, 6.8, 6.91; 250/227, 234, 208.1, 237 G; 235/439, 440, 454, 479; 358/474, 486, 496

[56] References Cited

U.S. PATENT DOCUMENTS

| | | | |
|---|---|---|---|
| 3,983,364 | 9/1976 | Firehammer et al. | 235/440 |
| 4,041,279 | 8/1977 | Foote | 235/454 |
| 4,602,242 | 7/1986 | Kimura | 250/237 G |
| 4,628,201 | 12/1986 | Schmitt | 250/237 G |
| 4,775,799 | 10/1988 | Milch et al. | 250/578 |

Primary Examiner—Bruce Y. Arnold
Assistant Examiner—Loha Ben
Attorney, Agent, or Firm—Seidel, Gonda, Lavorgna & Monaco

[57] ABSTRACT

Apparatus for optically reading data by transverse orthogonal scanning of a moving rectangular flat information carrier, such as a card. The apparatus includes a driver for advancing the carrier. The driver has two drive wheels and two cooperating idle rollers, the axes of which all lie in the vertical transverse main plane. Each drive wheel is independently driven by a separate electric stepper motor independently connected to control logic. By using independent stepper motors, the driver is able to straighten carriers not perfectly aligned as they enter the apparatus, and to permit reading of poorly printed carriers, achieving a high resolution even with mechanical components of conventional quality.

18 Claims, 1 Drawing Sheet

U.S. Patent  Oct. 16, 1990  4,963,726
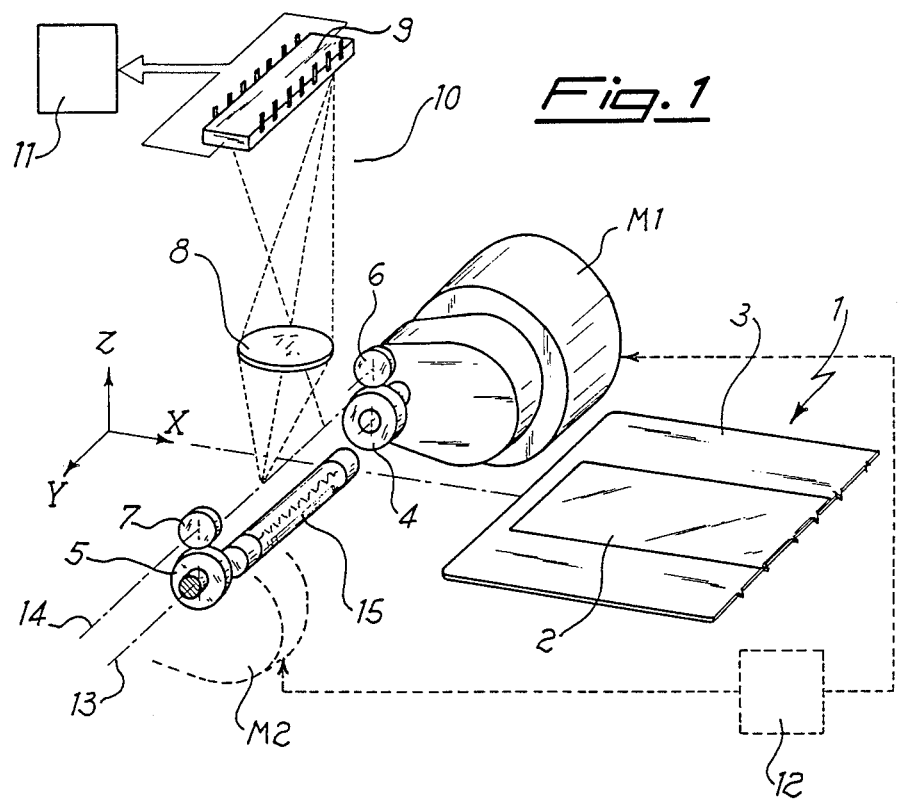
*Fig.1*
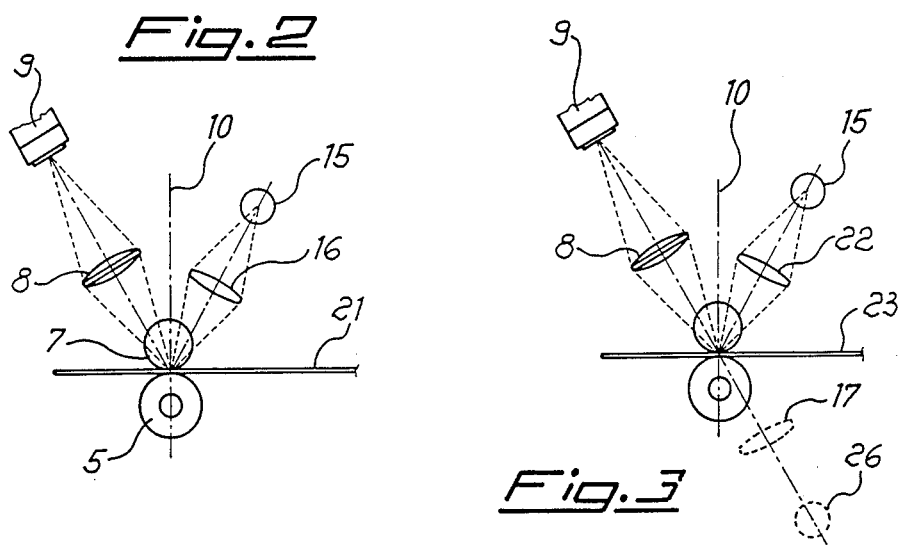
*Fig.2*  *Fig.3*

DEVICE FOR THE OPTICAL READING OF PLANAR INFORMATION CARRIERS

BACKGROUND OF THE INVENTION

This invention relates to a device for the transverse scanning optical reading of information carriers or media, more particularly of rectangular planar carriers in which data are stored, such as cards carrying an opaque or transparent band containing coded data, e.g. analogically coded, or dot or bar coded, and the like.

Several and different devices are known, generally called readers or scanners, which allow for the extraction of data from carriers carrying coded information, through magnetic, capacitive, optical or mechanical phenomena.

More particularly, the optical readers are considered with interest in view of the high resolution, non intrusiveness and good safety prospects of the optical reading.

The resolution of such devices is a function of the overlapping degree which can be obtained between the picture elements or pixels of the carrier to be read (or the corresponding focused picture), and the individual sensors or elemental sensors associated with the picture elements.

The known devices have, among the others, the drawback of being highly sensible to an incorrect carrier introduction, or to its uneveness and being asymmetric. This is a strong limit to the spreading of such devices since the reader has to be reliable and to accomplish its task also under non ideal conditions, e.g. with the carrier being inserted slightly inclined with respect to the reader axis, with worn carriers, or carriers having a width which is not constant, etc.

SUMMARY OF THE INVENTION

The object of the invention is therefore to provide for a device adapted for the optical reading of analogical data recorded on rectangular planar information carriers, without the above drawbacks, and more particularly which is intrinsically accurate and allows for the adjustment of the mechanical, optical and electronic parameters in such a way that upon reading all the pixels of the information carrier coincide, within a fraction of step, with the corresponding active elements of the sensor.

More particularly, the reader according to the invention aims to make it possible, in extended ranges, the correction for misalignments and/or geometrical defects of the halfrigid planar information carrier which might otherwise prejudice the reading.

This object is achieved through the invention which consists of a transverse scanning optical reader for data stored on a moving flat carrier, comprising at least a light source adapted to focus a light beam through a focusing means onto the carrier, a sensor which is adapted to receive said light beam after the interaction with the carrier, means for processing the information from the sensor, two independently driven electric motors, each equipped with a drive wheel and a cooperating idle roller engaging a side band of the carrier for advancing this latter during the reading, the rotation axes of said wheels and said rollers all laying in a plane perpendicular to the advancing direction of the carrier, which plane further includes the reading line (main transverse plane).

The invention will now be disclosed with reference to some preferred embodiments shown in the attached drawings.

BRIEF DESCRIPTION OF THE DRAWINGS

FIG. 1 shows a device according to the invention for the use with transparent information carriers;

FIG. 2 schematically illustrates another embodiment of the invention for the use with opaque information carriers; and FIG. 3 schematically illustrates another embodiment of the invention adapted for the use with transparent and opaque carriers.

DESCRIPTION OF PREFERRED EMBODIMENTS

The reader of the invention shown in FIG. 1 is provided for a flat or planar information carrier 1 of rectangular shape, comprising a middle transparent band 2 storing the information data, and a neutral zone 3 surrounding the transparent band 2 and forming two side strips for the engagement with the advancing means of the reader.

Such advancing means comprises two laterally located drive wheels 4, 5 driven by two separate and independent motors, or better geared motors, M1 and M2 (this latter being only partially shown with dashed line for clarity of illustration). The advancing means further comprises two idle reaction rollers or counter-rollers 6, 7 positioned above the drive wheels and elastically floating in a vertical plane thanks to springing members (not shown). Preferably the idle rollers 6, 7 are positioned above the drive wheels 4, 5, but it is also conceivable an arrangement in which they are positioned under the drive wheels 4, 5, e.g. when looking for the maximum compactness, or when providing a reader for opaque carriers as will be apparent later, to take into account uncertainties as to the carrier thickness.

The axes 13 and 14 of the two drive wheels and of the two idle rollers lay in a transverse plane 10 which is perpendicular to the carrier advancement direction and is called main transverse plane. Preferably the drive wheels 4, 5 are covered with rubber (rubberized), or roughened, or provided with fine metallized diamonds over their outer surfaces. They can even be smooth, chromium plated or subjected to other surface treatments, in view of the material of the carrier, to prevent undesired slippages. A light source or illuminator 15 able to direct a linear light beam onto the carrier 1, is positioned under the advancing means. In this case the illuminator comprises a linear filament lamp placed very near the active surface of the information carrier.

A lens or equivalent focusing device 8 is provided on the upper part of the device to concentrate the light beam passing through the carrier, and to project it onto the axis of the overhanging sensor 9, made up for example by an array of automatically scanned photodiodes and connected to processing means of the so obtained signals, which is generally referred to by numeral 11 and not further described not being part of the invention.

More particularly, the lens 8 is so positioned as to project onto the axis of sensor 9 the main dihedral line formed by the transverse vertical plane 10 and by the active surface of the information carrier 1, therefore ignoring transparent protective layers, if any. Geared motors M1 and M2 comprise two independent motors, preferably of the step by step type, which are controlled by the system logic of the unit marked with 12, and comprising a microcontroller and/or dedicated electronics.

From the signals of the photodiode array 9 it is possible to correct an incorrect alignment of the carrier. To this aim, additional and not shown outer photodiodes recognize specific reference, centering and synchronizing patterns provided on the carrier and with the aid of a suitable program, it is possible to drive the wheels at different speeds in order to put straight information carriers that have been badly introduced or even misprinted. The logic can also take care of the centering by using information from the edge or periphery of the card active portion.

By using two independent stepping motors, and possibly employing a differential microstepping advancement control technique, it is possible to correct eccentricities, diameter changes of the wheels and transmission errors. Moreover the motors can be individually and continuously controlled by different frequencies and/or phases.

With reference to the three axes of coordinates shown in FIG. 1, the two motors M1 and M2 directly control the advancing along the longitudinal X axis, and can indirectly control also the transverse Y axis which is anyhow electronically scanned for extracting data. The card is forcibly in contact with the two drive wheels 4, 5 and defines the vertical position along the Z axis, whereas the rotation about the Z axis is controlled by the differential motors advancement. Rotation about the Y axis is of no importance, whereas the rotation about the X axis is prevented by the two wheels. Stability of the Z axis depends upon the mechanical qualities of the components.

FIGS. 2 and 3 show two further embodiments of the invention, the same numerals of FIG. 1 being used for equal or similar parts. The embodiment shown in FIG. 2 which illustrates a schematic side view of the reader, is useful for the reading of opaque information carriers 21 and is of the Y reflection type. It comprises drive members 5–7 and 4–6 only the first couple of which is shown in the Figure, a light source 15 focused onto the carrier 21 through a cylindrical lens 16, and a photodiode array 9, a spherical lens 8 being positioned on the same side of the source with respect to the carrier plane. As can be seen in FIG. 2, the main vertical transverse plane 10 forms a common dihedral with the lens-sensor plane and the illuminator assembly 15–16.

The embodiment shown in FIG. 3 is adapted to read information carriers 23 which are either opaque or transparent, and provides for an X arrangement having two illuminator assemblies, 15–22 and 26–17 respectively, each comprising a light source and a cylindrical lens.

As for the light sources, they can comprise incandescent lamps having a linear or slightly twisted wire, semiconductor sources, and also discharge tubes in some applications. In certain cases, e.g. for high resolution and reading speed, laser source can be used, with more complex optical arrangements (at least two crossed cylindrical lenses). Moreover the optical path can be bent by means of mirrors and prisms in order to reduce the overall dimensions.

I claim:

1. A device for transverse-scan optical reading of data stored on a moving flat information carrier, comprising at least a light source arranged to focus a light beam through a focusing means onto the carrier, sensing means for receiving said light beam after the interaction thereof with the carrier and for outputting information, means for processing the information from the sensing means, two independently driven electric motors, each equipped with a drive wheel and a cooperating idle roller engaging a side band of the carrier for advancing the carrier during reading, the rotation axes of said drive wheels and said rollers all lying in a main transverse plane perpendicular to the advancing direction of the carrier, wherein said plane further includes a reading line on the information carrier.

2. A device as claimed in claim 1, wherein said two motors are stepping motors.

3. A device as claimed in claim 2, wherein each of said rollers is positioned above an associated drive wheel.

4. A device as claimed in claim 1, wherein each of said rollers is positioned above an associated drive wheel.

5. A device as claimed in claim 4, wherein the surfaces of said drive wheels are rubberized or roughened.

6. A device as claimed in claim 1, wherein the surfaces of said drive wheels are rubberized or roughened.

7. A device as claimed in claim 6, wherein said two motors are controlled by the system logic processing the signals from the sensing means disposed transversally with respect to the carrier.

8. A device as claimed in claim 7, wherein said two motors are individually and continuously controlled by different frequencies and/or phases.

9. A device as claimed in claim 8, wherein said two motors are controlled by differential microstepping.

10. A device as claimed in claim 9, further comprising a Y reflection arrangement with a sensor and an illuminator which includes a light source and a cylindrical lens positioned on the same side with respect to the information carrier.

11. A device as claimed in claim 1, further comprising a Y reflection arrangement with a sensor and an illuminator which includes a light source and a cylindrical lens positioned on the same side with respect to the information carrier.

12. A device as claimed in claim 11, for reading both opaque and transparent information carriers, further comprising an X optical arrangement having an additional illuminator behind the plane in which the carrier is advanced.

13. A device as claimed in claim 2, wherein the surfaces of said drive wheels are rubberized or roughened.

14. A device as claimed in claim 2, further comprising a Y reflection arrangement with a sensor and an illuminator which includes a light source and cylindrical lens positioned on the same side with respect to the information carrier.

15. A device as claimed in claim 4, further comprising a Y reflection arrangement with a sensor and an illuminator which includes a light source and a cylindrical lens positioned on the same side with respect to the information carrier.

16. A device as claimed in claim 6, further comprising a Y reflection arrangement with a sensor and an illuminator which includes a light source and cylindrical lens positioned on the same side with respect to the information carrier.

17. A device as claimed in claim 7, further comprising a Y reflection arrangement with a sensor and an illuminator which includes a light source and a cylindrical lens positioned on the same side with respect to the information carrier.

18. A device as claimed in claim 8, further comprising a Y reflection arrangement with a sensor and an illuminator which includes a light source and a cylindrical lens positioned on the same side with respect to the information carrier.

* * * * *